(12) United States Patent
Tomasiak et al.

(10) Patent No.: US 11,684,226 B2
(45) Date of Patent: Jun. 27, 2023

(54) MOTOR COVER FOR WET/DRY VACUUM CLEANER WITH VENT OPENINGS

(71) Applicant: Emerson Electric Co., St. Louis, MO (US)

(72) Inventors: Mark J. Tomasiak, St. Peters, MO (US); Douglas C. Schultz, Glen Carbon, IL (US)

(73) Assignee: Emerson Electric Co., St. Louis, MO (US)

( * ) Notice: Subject to any disclaimer, the term of this patent is extended or adjusted under 35 U.S.C. 154(b) by 1080 days.

(21) Appl. No.: 16/294,487

(22) Filed: Mar. 6, 2019

(65) Prior Publication Data

US 2019/0328191 A1 Oct. 31, 2019

Related U.S. Application Data

(63) Continuation-in-part of application No. 29/645,957, filed on Apr. 30, 2018, now Pat. No. Des. 876,738.

(51) Int. Cl.
*A47L 7/00* (2006.01)
*H02K 5/10* (2006.01)
(Continued)

(52) U.S. Cl.
CPC ............ *A47L 7/0019* (2013.01); *A47L 5/00* (2013.01); *A47L 5/36* (2013.01); *A47L 5/362* (2013.01);
(Continued)

(58) Field of Classification Search
CPC .......... A47L 5/365; A47L 7/00; A47L 7/0019; A47L 9/00; A47L 9/0411; H02K 2205/09; H02K 5/10; H02K 5/20; H02K 5/207
See application file for complete search history.

(56) References Cited

U.S. PATENT DOCUMENTS 3,165,774 A 1/1965 Barba
3,240,000 A 3/1966 Hayes et al.
(Continued)

FOREIGN PATENT DOCUMENTS

DE 202014009238 U1 * 1/2015 ............... A47L 5/24
JP 10328094 A * 12/1998
(Continued)

OTHER PUBLICATIONS

DE-202014009238-U1—English machine translation (Year: 2015).*

*Primary Examiner* — Marc Carlson
(74) *Attorney, Agent, or Firm* — Armstrong Teasdale LLP

(57) ABSTRACT

A motor cover includes a lattice structure defining a plurality of vent openings that provide ventilation of the motor cover. Each vent opening of the plurality of vent openings is defined by a first cross member, a second cross member, a first side member, and a second side member of the lattice structure. The second cross member is spaced vertically below the first cross member and the first side member is spaced horizontally forward from the second side member. Each of the first and second side members extend from the first cross member to the second cross member. The second cross member extends further outward from a central vertical axis of the motor cover than the first cross member, and the first side member extends further outward from the central longitudinal axis than the second side member.

20 Claims, 9 Drawing Sheets

(51) Int. Cl.
*H02K 5/20* (2006.01)
*A47L 5/36* (2006.01)
*A47L 5/00* (2006.01)
*A47L 9/04* (2006.01)

(52) U.S. Cl.
CPC .............. *A47L 7/00* (2013.01); *A47L 9/0411* (2013.01); *H02K 5/10* (2013.01); *H02K 5/207* (2021.01); *H02K 2205/09* (2013.01)

(56) References Cited

U.S. PATENT DOCUMENTS

| | | |
|---|---|---|
| 4,542,557 A | 9/1985 | Levine |
| 5,143,655 A * | 9/1992 | Chiu .................... F24F 6/043 261/24 |
| 5,950,753 A | 9/1999 | Muldoon et al. |
| 6,099,371 A | 8/2000 | Nozawa et al. |
| 6,158,083 A | 12/2000 | Holsten |
| D438,353 S | 2/2001 | Hoshino |
| 6,286,472 B1 | 9/2001 | Takahashi et al. |
| 6,457,206 B1 | 10/2002 | Judson |
| 6,524,085 B2 | 2/2003 | Shoda et al. |
| D506,042 S * | 6/2005 | Griffin ........................ D32/21 |
| D506,857 S | 6/2005 | Griffin |
| D512,545 S | 12/2005 | Griffin |
| D521,700 S | 5/2006 | Griffin |
| 7,067,946 B2 | 6/2006 | Noda et al. |
| 7,198,656 B2 | 4/2007 | Takemoto et al. |
| 7,370,389 B2 | 5/2008 | Tsen |
| 7,374,408 B2 | 5/2008 | Savage et al. |
| 7,524,224 B2 | 4/2009 | Ide et al. |
| D614,369 S * | 4/2010 | Theising ........................ D32/31 |
| D618,870 S * | 6/2010 | Williams ....................... D32/24 |
| 7,877,836 B2 | 2/2011 | O'Neal |
| 8,020,251 B2 | 9/2011 | Luebbering et al. |
| 8,336,517 B2 | 12/2012 | Konakawa et al. |
| D676,205 S | 2/2013 | Theising |
| 8,365,347 B2 | 2/2013 | Morgan et al. |
| 8,454,401 B2 | 6/2013 | Sakata et al. |
| 8,997,308 B2 | 4/2015 | Cortes Ruiz et al. |
| 9,027,198 B2 | 5/2015 | Conrad |
| 9,062,721 B2 | 6/2015 | Akahane et al. |
| 9,506,667 B2 * | 11/2016 | Lee .......................... F24F 6/16 |
| 9,693,666 B2 * | 7/2017 | Conrad ..................... A47L 5/24 |
| 2017/0191677 A1 * | 7/2017 | Jeong .................... F24F 1/0047 |

FOREIGN PATENT DOCUMENTS

| | | | |
|---|---|---|---|
| JP | 2014020708 A | * | 2/2014 |
| JP | 2017026309 A | * | 2/2017 |

* cited by examiner

MOTOR COVER FOR WET/DRY VACUUM CLEANER WITH VENT OPENINGS

CROSS-REFERENCE TO RELATED APPLICATIONS

This application is a continuation-in-part application of U.S. patent application Ser. No. 29/645,957, filed Apr. 30, 2018, which is hereby incorporated by reference in its entirety.

FIELD

The field of the disclosure relates generally to vacuum cleaners and, more particularly, to vacuum cleaner motor covers including vent openings.

BACKGROUND

Some vacuum appliances, in particular wet/dry vacuum cleaners, include lid-mounted motors that facilitate the movement of air using a motor and an impeller connected to the motor. Some vacuum cleaners also include vent openings or other ventilation means, for example, to provide cooling air to a motor of the vacuum cleaner. Such vent openings may provide a point of ingress for water and other liquids into a motor chamber of the vacuum cleaner, which may adversely affect operation of the vacuum cleaner.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a motor cover for a vacuum cleaner defines a motor cavity for enclosing a motor of the vacuum cleaner. The motor cover includes an exhaust located at a rear of the motor cover. The motor cover defines a front located opposite from the rear, and further defines a central longitudinal axis extending from the front of the motor cover to the rear of the motor cover. The motor cover further includes a lattice structure defining a plurality of vent openings that provide ventilation of the motor cover. Each vent opening of the plurality of vent openings is defined by a first cross member, a second cross member, a first side member, and a second side member of the lattice structure. The second cross member is spaced vertically below the first cross member and the first side member is spaced horizontally forward from the second side member. Each of the first and second side members extends from the first cross member to the second cross member. The second cross member extends further outward from a central vertical axis of the motor cover than the first cross member, and the first side member extends further outward from the central longitudinal axis than the second side member.

In another aspect, a vacuum cleaner includes a canister defining a debris chamber, a lid mounted to a top of the canister and enclosing the debris chamber, a motor cover connected to the lid and defining a motor cavity, a motor connectable to a power source and enclosed within the motor cavity, and an impeller connected to the motor and operable to generate air flow through the debris chamber upon operation of the motor. The motor cover includes a lattice structure defining a plurality of vent openings that provide ventilation of the motor cover. Each vent opening of the plurality of vent openings is shaped and oriented to prevent water ingress into the motor cavity.

In yet another aspect, a power head for a vacuum cleaner includes a motor cover defining a motor cavity, a motor connectable to a power source and enclosed within the motor cavity, and an impeller connected to the motor and operable to generate air flow upon operation of the motor. The motor cover includes a lattice structure defining a plurality of vent openings that provide ventilation of the motor cover. Each vent opening of the plurality of vent openings is shaped and oriented to prevent water ingress into the motor cavity.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
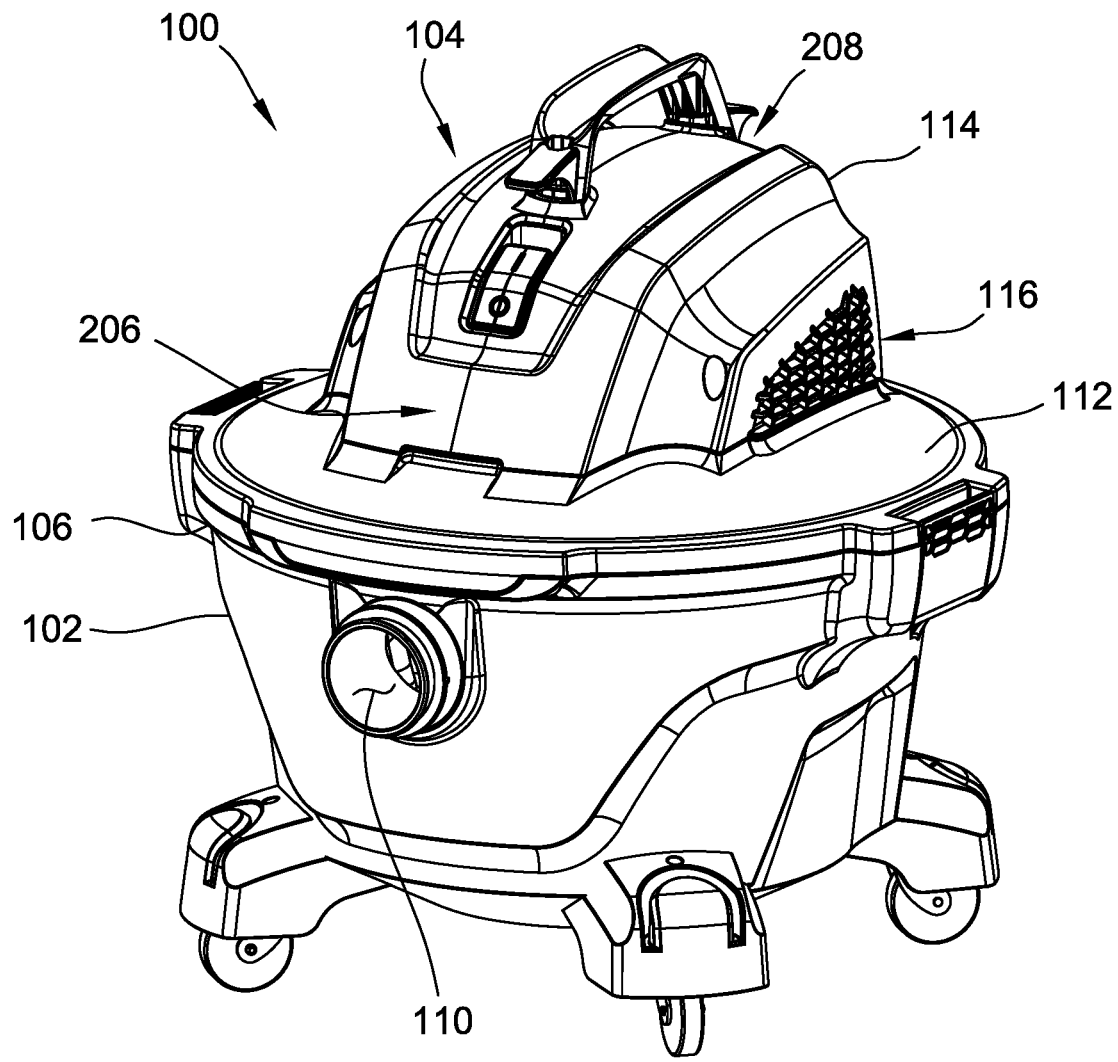
FIG. 1 is a perspective view of an example vacuum cleaner.
Figure 2:
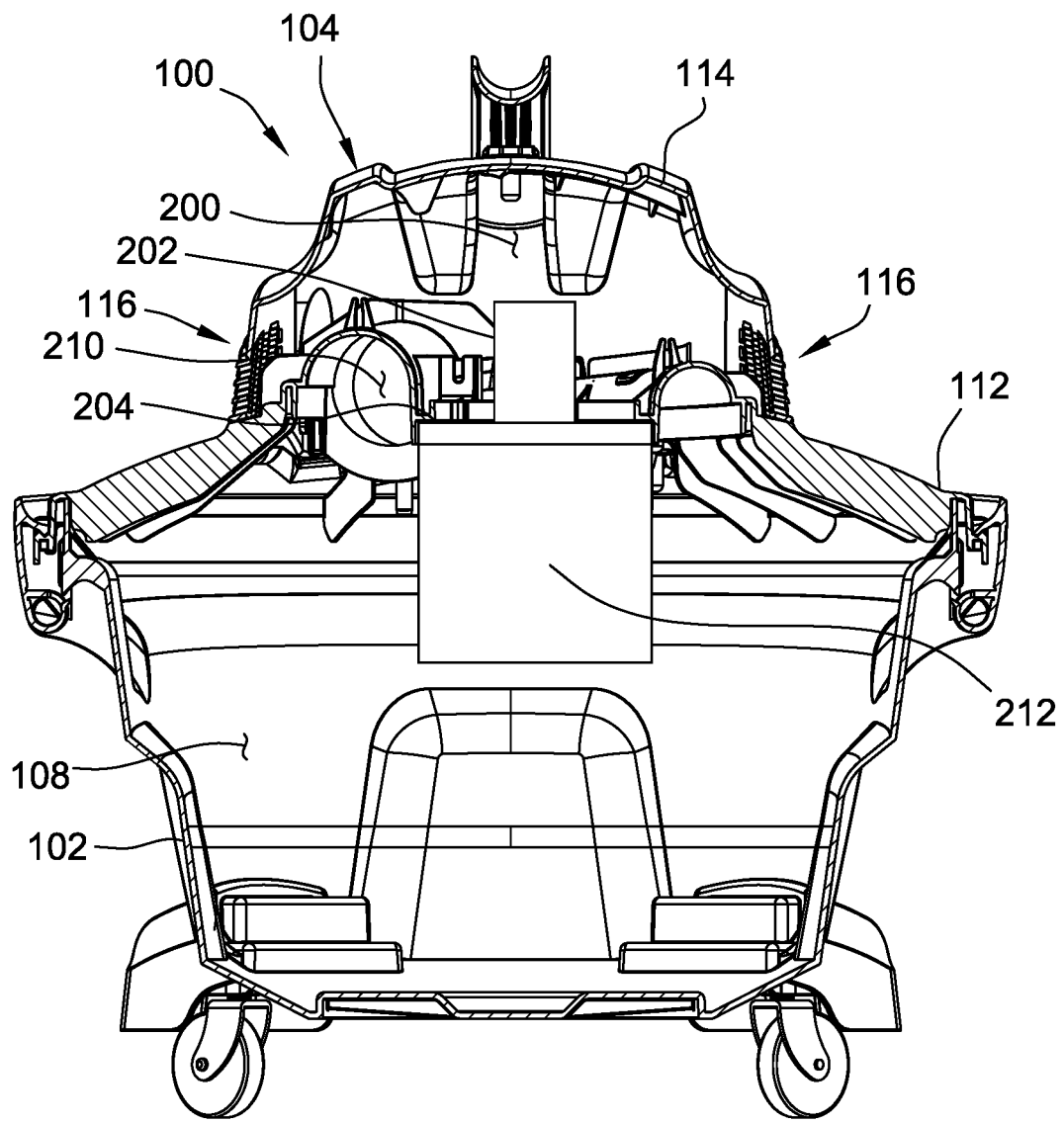
FIG. 2 is a sectional view of the vacuum cleaner of FIG. 1.

With reference to the drawings, and in particular FIGS. 1 and 2, an example vacuum cleaner is indicated generally at 100. In the illustrated embodiment, the vacuum cleaner 100 is a wet/dry vacuum cleaner including a collection drum or canister 102 and a powerhead 104 mounted to a top 106 of the canister 102. The canister 102 defines a debris chamber 108 and an inlet 110 through which debris and fluids can enter the debris chamber 108.

The powerhead 104 includes a lid portion 112 (generally, a lid) and a motor cover 114 connected to the lid 112 and defining a motor cavity 200 for enclosing a motor 202 of the vacuum cleaner 100. The motor cover 114 defines a front 206 located opposite from a rear 208. The motor cover 114 further defines a central longitudinal axis 600 (shown in FIG. 6) extending from the front 206 of the motor cover 114 to the rear 208 of the motor cover 114.

The lid 112 encloses the debris chamber 108, and is removably attached to the canister 102 so that the lid 112 can be readily removed to empty debris or liquids contained within the canister 102. In the illustrated embodiment, the lid 112 is formed integrally as one piece of material with the motor cover 114, for example, by a suitable injection molding technique. In other embodiments, the lid 112 may be formed separately from the motor cover 114 and configured to receive the motor cover 114. In such embodiments, the motor cover 114 may be removably connected to the lid 112.

The powerhead 104 also includes a fan or impeller 204 connected to the motor 202. The motor 202 is connectable to a power source, for example by means of a power cord (not shown). The impeller 204 is operable to generate airflow through the debris chamber 108 from the inlet 110 to an exhaust 210 upon operation of the motor 202 so as to draw solid debris, liquids, or both into the debris chamber 108 defined by the canister 102. In the example embodiment, the inlet 110 is defined by the canister 102, and the exhaust 210 is defined by the motor cover 114, specifically at the rear 208 of the motor cover 114. In other embodiments, the inlet 110 and the exhaust 210 may be defined by any suitable portion of the vacuum cleaner 100 that enables the vacuum cleaner 100 to function as described herein. In some embodiments, for example, the inlet 110 may be defined by the lid 112.

In the illustrated embodiment, the vacuum cleaner 100 further includes a filter assembly 212 connected to, and depending downward from, the powerhead 104 and into the debris chamber 108 to filter debris. In operation, when the motor 202 is energized, air flows into the canister 102 through the vacuum inlet 110, through the filter assembly 212, and into the powerhead 104 before being exhausted back into an environment surrounding the vacuum cleaner 100 through the exhaust 210.

Figure 3:
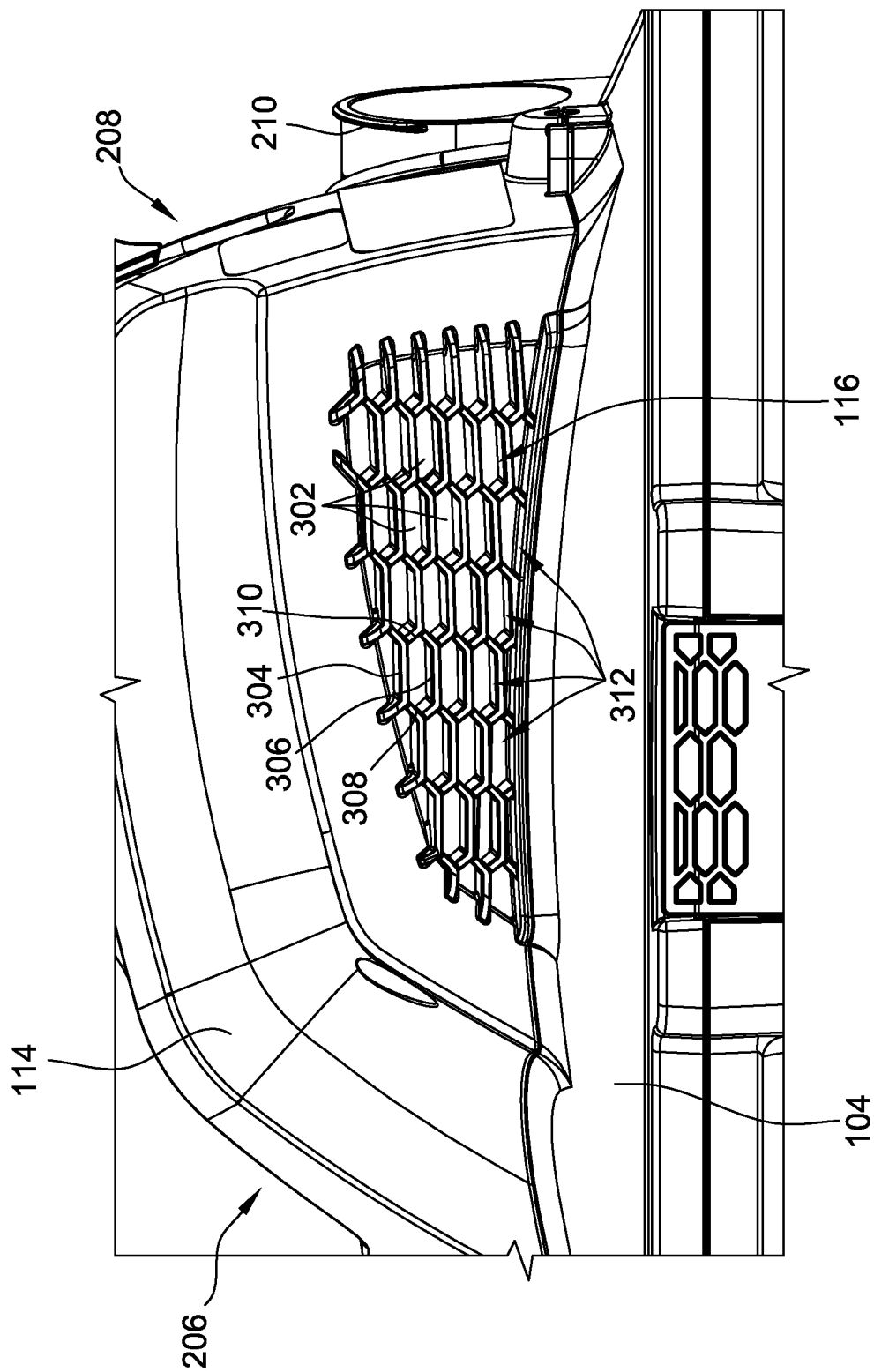
FIG. 3 is an enlarged view of a motor cover of the vacuum cleaner of FIG. 1, illustrating details of a lattice structure of the motor cover.

In the illustrated embodiment, the motor cover 114 includes a plurality of lattice structures 116 that each defines a plurality of vent openings 302 (shown in FIG. 3). The vent openings 302 provide fluid communication between the motor cavity 200 and an environment surrounding the vacuum cleaner 100 to permit airflow therebetween. Air flow enabled by the vent openings 302 may contribute to maintaining a suitable operating environment within the motor cavity 200. For example, air flow enabled by the vent openings 302 may help maintain a temperature within the motor cavity 200 suitable for operation of operational components enclosed within the motor cavity 200 (e.g., the motor 202).

The motor cover 114 includes two lattice structures 116 arranged on substantially opposite sides of the motor cover 114. That is, the motor cover 114 includes a first lattice structure 116 defining a first plurality of vent openings 302 on a first side of the motor cover 114, and a second lattice structure defining a second plurality of vent openings located on a second side of the motor cover 114 opposite the first side. In other embodiments, the motor cover 114 may include any suitable number of lattice structures 116 arranged at any suitable locations that enables the vacuum cleaner 100 to function as described herein.

With additional reference to FIG. 3, each vent opening 302 is shaped and oriented to prevent water ingress into the motor cavity 200. In the illustrated embodiment, for example, each vent opening 302 is defined by a first cross member 304, a second cross member 306, a first side member 308, and a second side member 310 of the lattice structure 116. The second cross member 306 is spaced vertically below the first cross member 304, and the first side member 308 is spaced horizontally forward from the second side member 310. Each of the first 308 and second side members 310 extend from the first cross member 304 to the second cross member 306.

The relative positioning and orientation of the first cross-member 304 and second cross-member 306 of each vent opening 302 facilitates preventing water or liquid ingress into the motor cavity 200. For example, the first cross-member 304 and second cross-member 306 of each vent opening 302 cause water or liquid to be shed outwardly and away from the interior of the motor cover 114 as the water or liquid flows from a top of the motor cover 114 to a bottom of the motor cover 114. The lattice structure 116 and vent openings 302 thereby facilitate preventing water or liquid ingress into the motor cavity 200, and protecting water or liquid sensitive components housed within the motor cavity when the vacuum cleaner is exposed to, for example, a wet environment.

Similarly, the relative positioning and orientation of the first side member 308 and second side member 310 of each vent opening 302 facilitates preventing water or liquid ingress into the motor cavity 200 when the vacuum cleaner 100 is oriented such that the exhaust 210 is oriented upward. For example, the first side member 308 and second side member 310 of each vent opening 302 are positioned and oriented to cause water or liquid to be shed outwardly and away from the interior of the motor cover 114 as the water or liquid flows from the rear 208 of the motor cover 114 toward the front 206 of the motor cover 114. In this way, the first side member 308 and second side member 310 of each vent opening 302 facilitate preventing water or liquid discharged from the exhaust 210 (e.g., when the vacuum cleaner 100 is tipped forward) from entering the motor cavity 200.

The lattice structure 116 and vent openings 302 therefore facilitate operation of the vacuum cleaner 100 in wet conditions that may otherwise cause water or liquid sensitive components housed within the motor cover 114 to be compromised due to water or liquid ingress.

The lattice structure 116 shown is a hexagonal lattice structure such that each vent opening 302 is shaped hexagonally. In other embodiments, the vent openings 302 may be substantially triangular, rectangular, pentagonal, octagonal, circular, oval-shaped, or any shape that enables the vacuum cleaner 100 to function as described herein. Further, in the illustrated embodiment, each of the first 308 and second side members 310 is V-shaped. In other embodiments, the first 308 and second side members 310 may be U-shaped, L-shaped, or any shape that enables the vacuum cleaner 100 to function as described herein.

Figure 4:
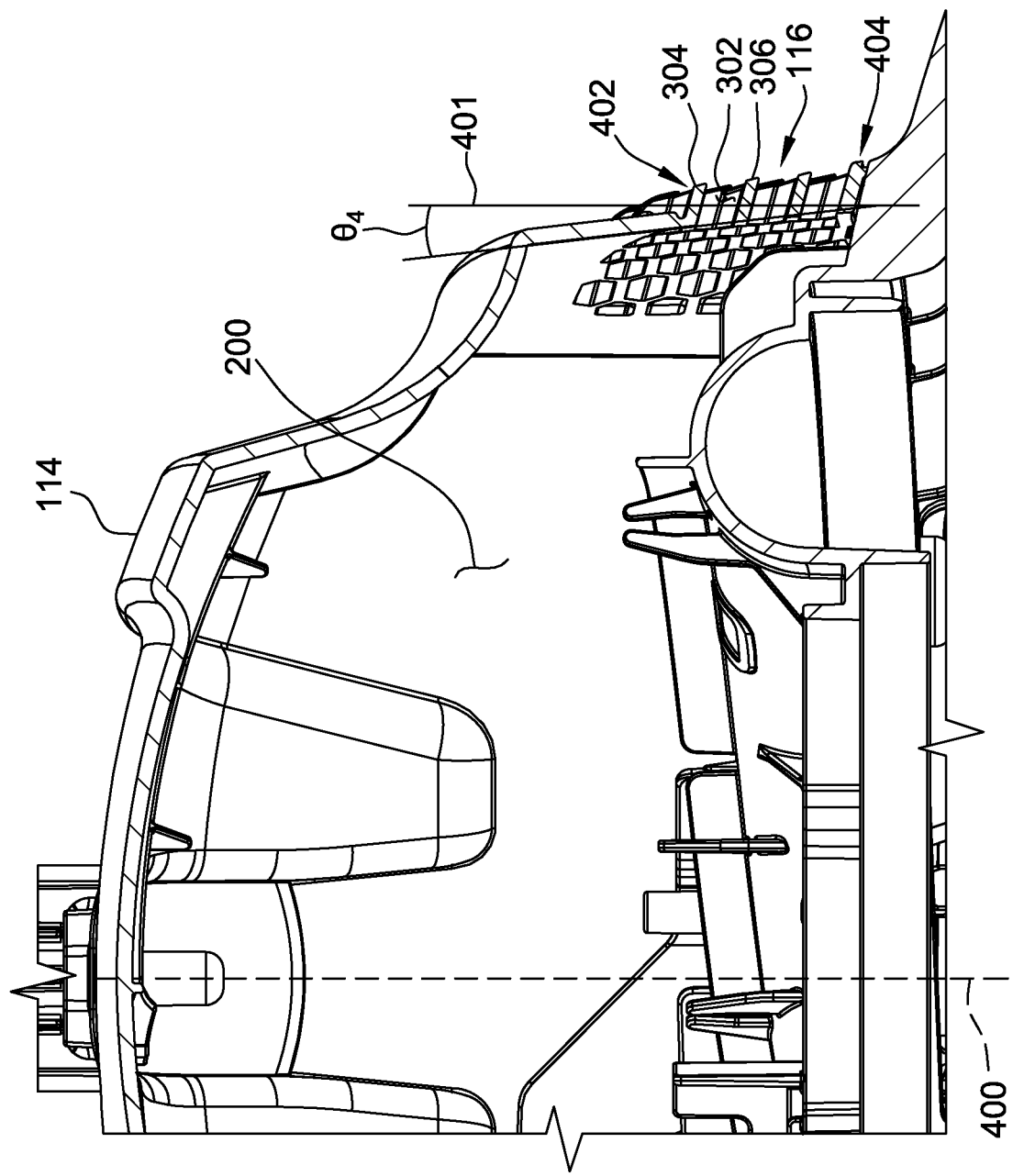
FIG. 4 is a sectional view of a portion of the vacuum cleaner of FIG. 1.

FIG. 4 is a sectional view of a portion of the vacuum cleaner 100 taken along a vertical plane through the motor cover 114. A central vertical axis of the motor cover 114 is indicated at line 400. Line 401 is a second vertical axis parallel to the central vertical axis 400. As shown in FIG. 4, the lattice structure 116 is oriented at an oblique angle $\theta_4$ relative to the central vertical axis 400 of the motor cover 114 such that a top 402 of the lattice structure 116 is located closer to the central vertical axis than a bottom 404 of the lattice structure 116. The orientation of the lattice structure 116 facilitates shedding water and other liquids outward from the motor cavity, which inhibits water and other liquids from damaging electrical components of the vacuum cleaner 100, such as the motor 202. As shown in FIG. 4, for example, the orientation of the lattice structure 116 results in the second cross member 306 of each vent opening 302 extending further outward from the central vertical axis 400 of the motor cover 114 than the first cross member 304 of each vent opening 302. Consequently, as water or liquid falls from a top of the motor cover 114 downward, the water or liquid will be directed outward and away from the motor cavity 200 by the first cross member 304 and fall down onto the second cross member 306, where the water or liquid will be directed further outward and away from the motor cavity 200 by the second cross member 306. This pattern will continue until the water or liquid reaches the bottom 404 of the lattice structure 116, where the motor cover 114 meets the lid 112.

Figure 5:
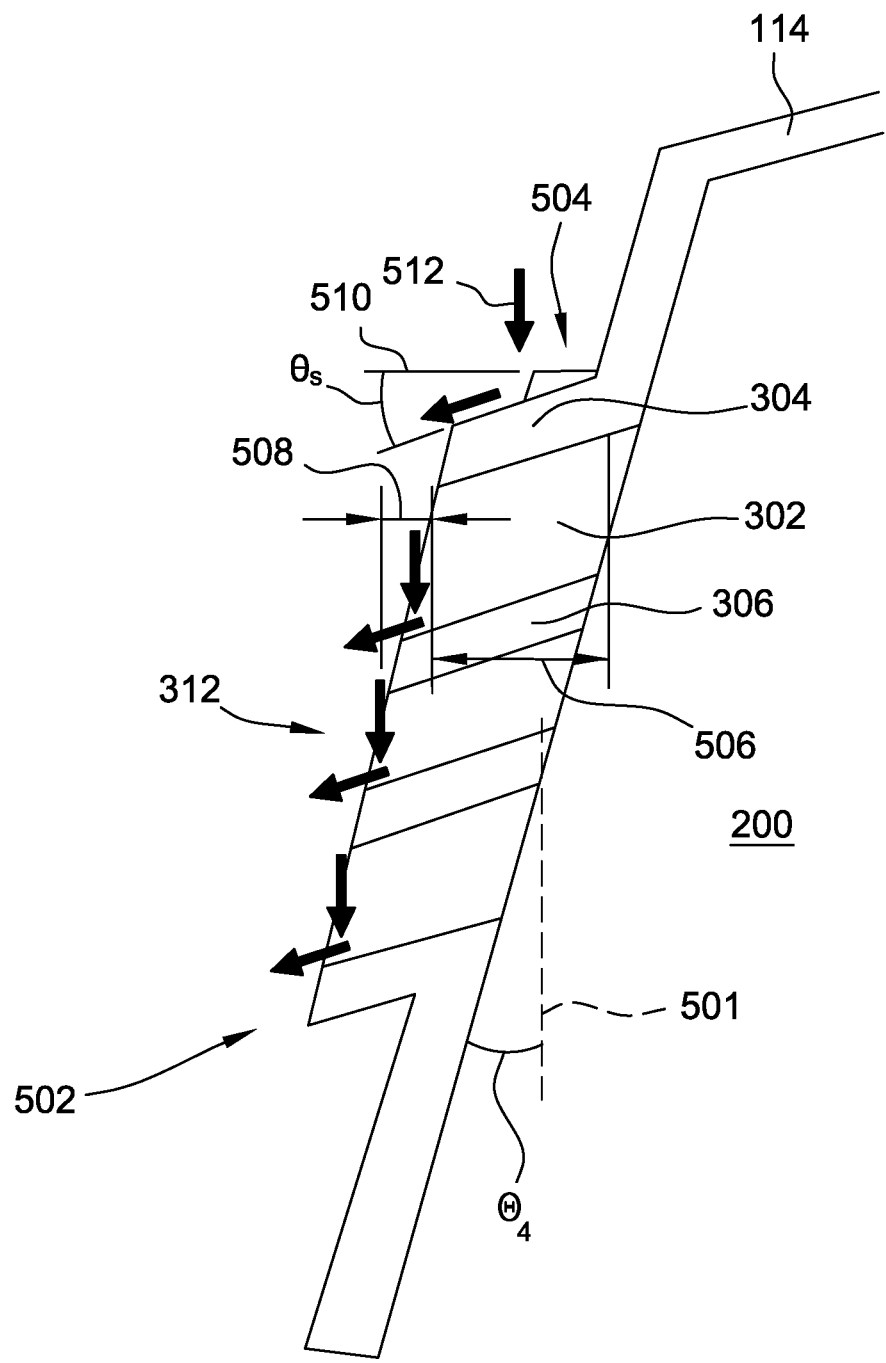
FIG. 5 is a schematic sectional view of a portion of the motor cover of FIG. 3.

The plurality of vent openings 302 are arranged in a plurality of columns 312 (FIG. 3) in the illustrated embodiment, where each column 312 includes at least two vent openings 302. FIG. 5 is a schematic sectional view of one of the columns 312. Line 501 in FIG. 5 illustrates a third vertical axis parallel to the central vertical axis 400 (shown in FIG. 4). As shown in FIG. 5, each column 312 of the lattice structure 116 is oriented at the oblique angle $\theta_4$ relative to the central vertical axis 400 of the motor cover 114 such that vent openings 302 located at a bottom 502 of the column 312 are positioned further outward from the central vertical axis 400 than vent openings 302 located at a top 504 of the column 312. As a result, as shown in FIG. 5, the second cross member 306 of each vent opening 302 extends further outward from the central vertical axis 400 (shown in FIG. 4) of the motor cover 114 than the first cross member 304 of each vent opening.

Stated another way, the second cross member 306 includes an overlapping segment 506 that vertically overlaps the first cross member 304, and a non-overlapping segment 508 that extends outward from the motor cavity 200 and beyond the first cross member 304. Each of the overlapping segment 506 and the non-overlapping segment 508 has a respective length. In the illustrated embodiment, a ratio of the length of the overlapping segment 506 to the length of the non-overlapping 508 segment is approximately 3:1. In other embodiments, the ratio of the length of the overlapping segment 506 to the length of the non-overlapping 508 segment is at least 2:1. In other embodiments, the ratio of the length of the overlapping segment 506 to the length of the non-overlapping 508 segment is any ratio that enables the vacuum cleaner 100 to function as described herein.

The first cross member 304 and second cross member 306 slope downward at an oblique angle $\theta_5$ relative to a horizontal plane 510 oriented perpendicular to the central vertical axis 400 of the motor cover 114. The first cross member 304 and second cross member 306 can be oriented at any suitable angle $\theta_5$ that enables the vacuum cleaner 100 to function as described herein. In the illustrated embodiment, $\theta_5$ is approximately 15°. In other embodiments, $\theta_5$ can be between 0° and 45°, between 5° and 45°, between 10° and 45°, between 10° and 40°, between 10° and 35°, between 20° and 45°, between 10° and 30°, between 15° and 35°, and between 20° and 40°.

The overlapping segments 506 and the non-overlapping 508 segments of the first 304 and second cross members 306, in combination with the downward slope of the first cross member 304 and the second cross member 306, facilitates preventing ingress of liquids, for example water, through the vent openings 302 and into the motor cavity 200. For example, a liquid, indicated by arrows 512 in FIG. 5, flowing over the motor cover 114 and lattice structure 116 is directed downward and away from the motor cavity 200 by the slope of the first cross member 304. As the liquid 512 flows from the first cross member 304 to the non-overlapping segment 508 of the second cross member 306, the slope of the second cross member 306 directs the liquid further outward and away from motor cavity 200, thereby preventing ingress of the liquid trough vent openings 302. This flow pattern continues down the column 312 of vent openings 302 until the liquid has reached the bottom 502 of the column 312.

Figure 6:
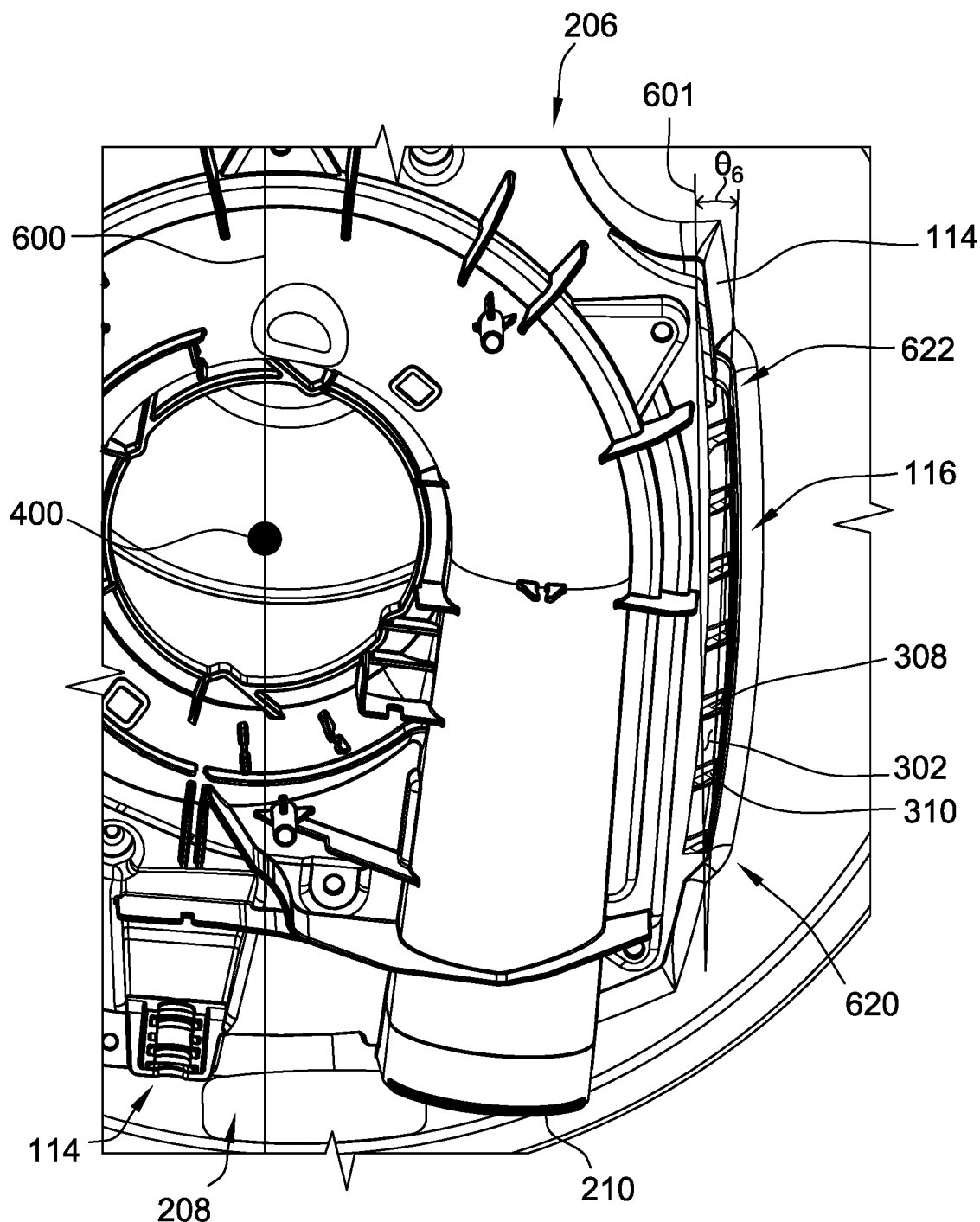
FIG. 6 is another sectional view of the vacuum cleaner of FIG. 1 taken along a plane that extends through the motor cover and the lattice structure of FIG. 3.
Figure 7:
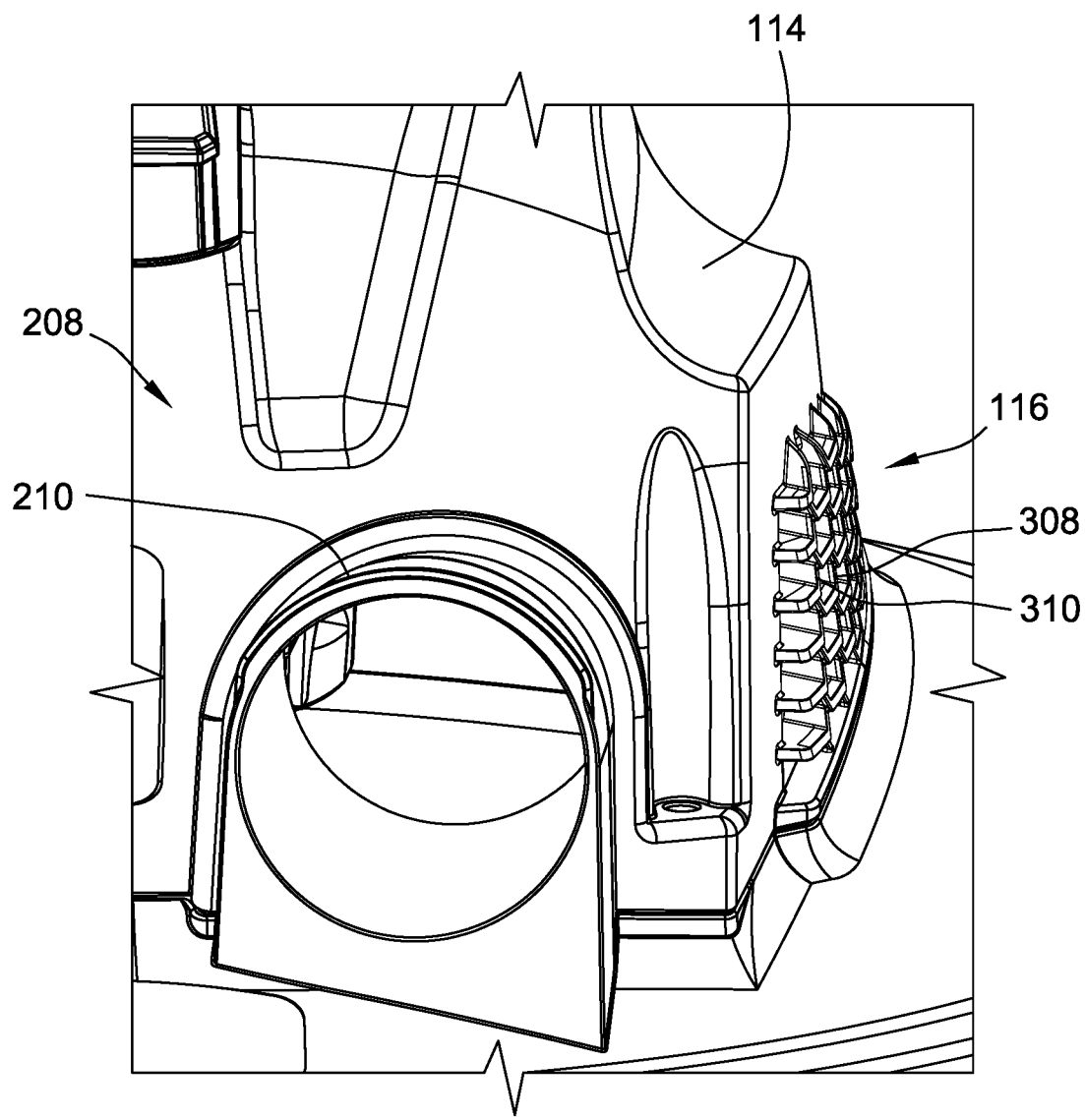
FIG. 7 is an enlarged rear view of the motor cover of FIG. 3.

FIG. 6 is another sectional view of the vacuum cleaner 100 taken along a plane that extends through the motor cover 114 and the lattice structure 116. As described above, the motor cover 114 defines a central longitudinal axis 600 extending from the front 206 of the motor cover 114 to the rear 208 of the motor cover 114. Line 601 in FIG. 6 indicates an axis parallel to the central longitudinal axis 600. In the illustrated embodiment, the lattice structure 116 is oriented at an oblique angle $\theta_6$ relative to the central longitudinal axis 600 of the motor cover 114 such that a back 620 of the lattice structure 116 is located closer to the central longitudinal axis 600 than a front 622 of the lattice structure 116. As a result, the first side member 308 of each vent opening 302 extends further outward from the central longitudinal axis 600 of the motor cover 114 than the second side member 310. Additionally, as shown in FIG. 7, the first side member 308 and the second side member 310 of each vent opening 302 are oriented and arranged such that, when viewed from the rear 208 of the motor cover 114, there are no visible openings in the lattice structure 116 through which water or other liquids can enter the motor cavity 200. Stated another way, there is no direct line-of-sight from the rear 208 of the motor cover 114 through the lattice structure 116 into the motor cavity 200.

Figure 8:
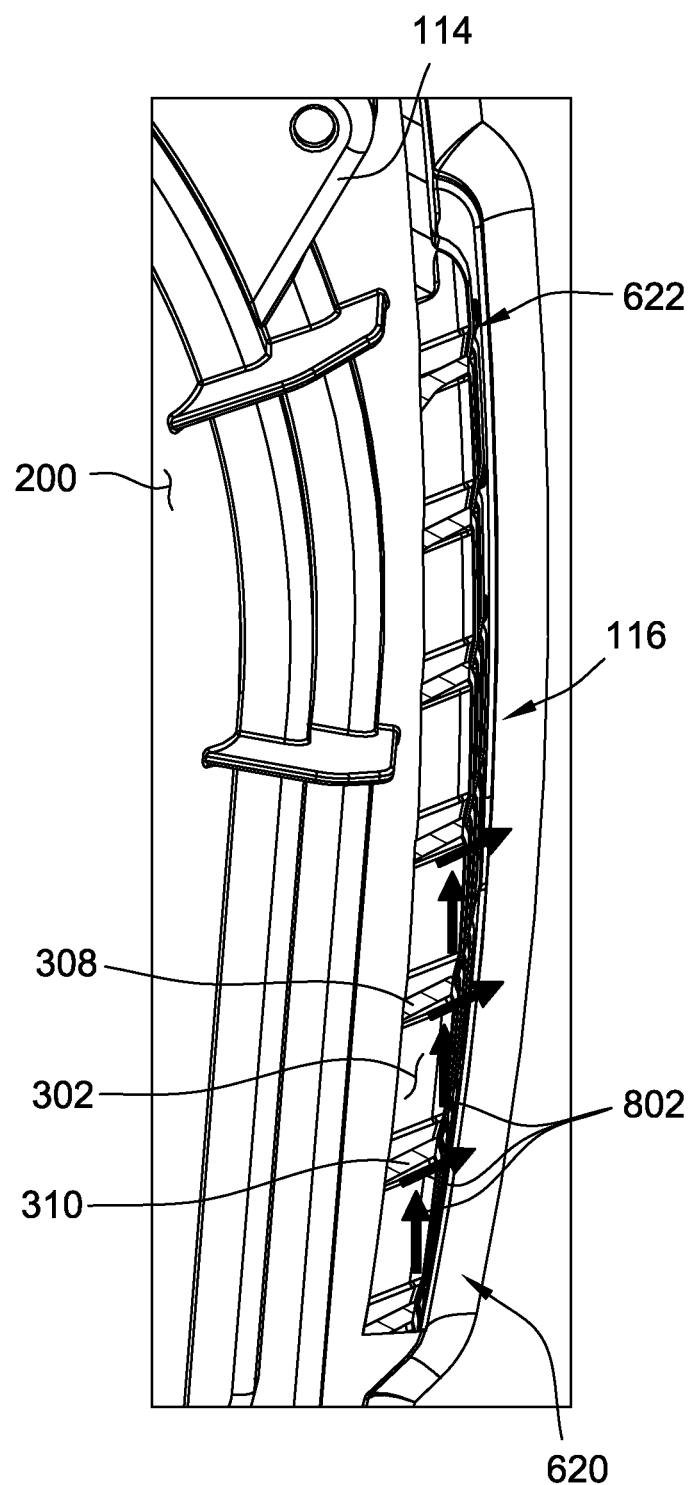
FIG. 8 is an enlarged sectional view of the motor cover of FIG. 6.

The first side member 308 and the second side member 310 thereby facilitate shedding water and other liquids outward and away from the motor cavity 200 in a manner similar to the first cross member 304 and the second cross member 306, for example, when the vacuum cleaner 100 is tipped forward and the exhaust 210 is oriented upward. Specifically, as shown in FIG. 8, a liquid, indicated by arrows 802 in FIG. 8, flowing over the motor cover 114 and lattice structure 116 is directed outward and away from the motor cavity 200 by the slope of the second side member 310. As the liquid 802 flows from the second side member 310 to first side member 308, the slope of the first side member 308 directs the liquid further outward and away from the motor cavity 200, thereby preventing ingress of the liquid trough vent openings 302. This flow pattern continues along the row of vent openings 302 until the liquid has reached the front 622 of the lattice structure 116.

Figure 9:
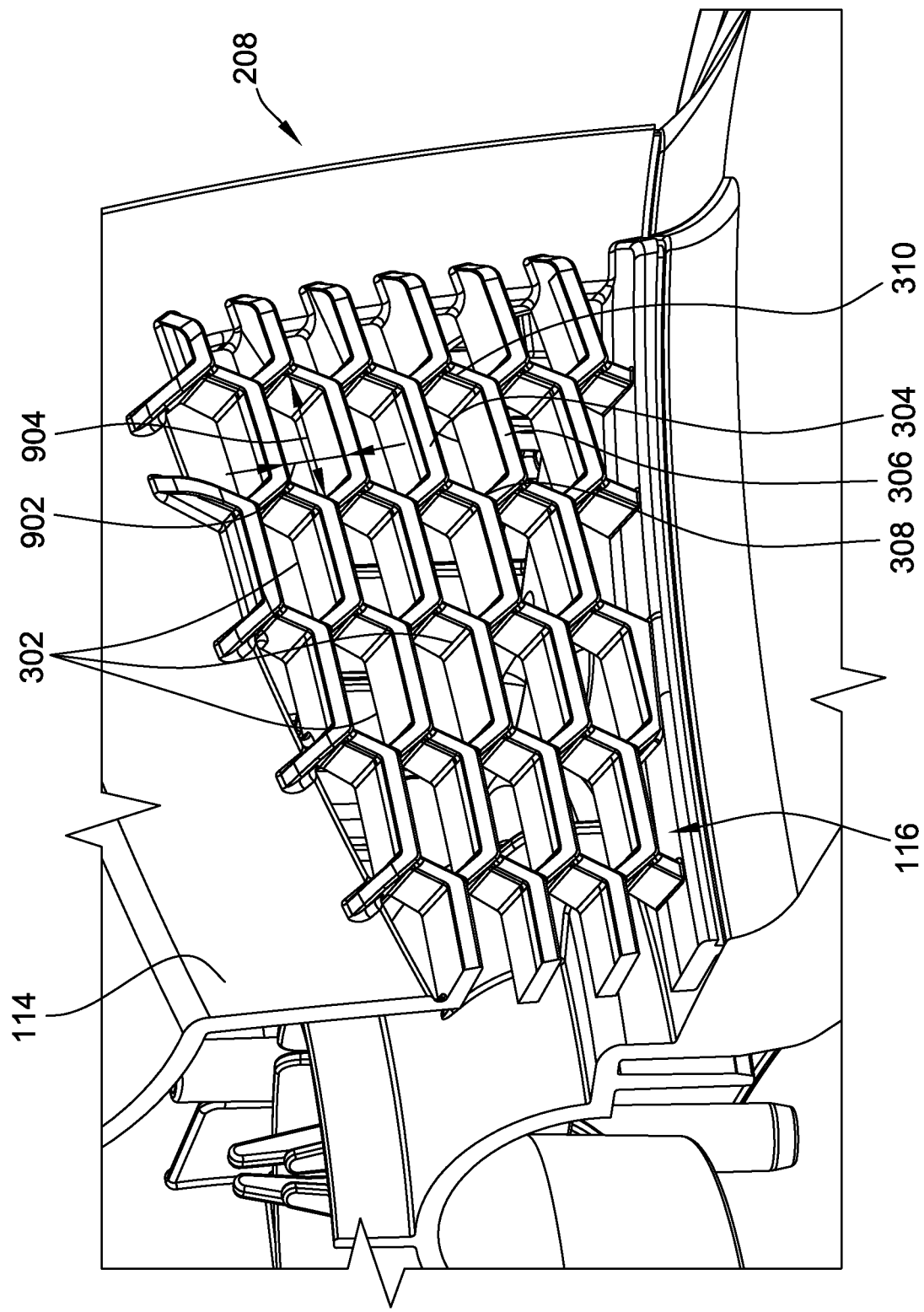
FIG. 9 is another enlarged view of the motor cover of FIG. 3, with a portion of the motor cover cut away.

FIG. 9 is another enlarged view of the motor cover of FIG. 3, with a portion of the motor cover cut away. In the illustrated embodiment, the vent openings 302 of lattice structure 116 have a height 902 and a width 904. In the illustrated embodiment, the ratio of the width 904 to the height 902 is approximately 2:1. In other embodiments, the ratio of the width 904 to the height 902 is approximately 3:1, 3:2, 1:1, 2:3, 1:2, 1:3, or any other ratio that enables the vacuum cleaner 100 to function as described herein.

Embodiments of vacuum cleaner motor covers described herein provide improved performance as compared to previous vacuum cleaners. For example, embodiments of the motor covers facilitate shedding water outward and away from a motor cavity of the vacuum cleaner in which electrical components of the vacuum cleaner, such as a motor, are housed. The motor covers thereby facilitate operation of the vacuum cleaners in wet or rainy conditions that may otherwise cause water or liquid sensitive components housed within the motor cover, such as the motor, to be compromised due to water or liquid ingress.

Example embodiments of vacuum cleaning systems are described above in detail. The vacuum cleaning systems are not limited to the specific embodiments described herein, but rather, components of the vacuum cleaning systems may be used independently and separately from other components described herein. For example, the motor covers and lattice structures described herein may be used with a variety of vacuum cleaning systems, including and without limitation, vehicular vacuum cleaning systems, wet/dry vacuum cleaners, canister vacuum cleaners, upright vacuum cleaners, and backpack vacuum cleaners. Additionally, embodiments of the motor covers and lattice structures described herein may be particularly suitable for use in vacuum systems that might otherwise be compromised due to exposure to rain or wet environments.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A motor cover for a vacuum cleaner, the motor cover defining a motor cavity for enclosing a motor of the vacuum cleaner, wherein the motor cover comprises:
   an exhaust located at a rear of the motor cover, the motor cover defining a front located opposite from the rear, the motor cover further defining a central longitudinal axis extending from the front of the motor cover to the rear of the motor cover; and
   a lattice structure defining a plurality of vent openings that provide ventilation of the motor cover, wherein each vent opening of the plurality of vent openings is defined by a first cross member, a second cross member, a first side member, and a second side member of the lattice structure, wherein the second cross member is spaced vertically below the first cross member and the first side member is spaced horizontally forward from the second side member, each of the first and second side members extending from the first cross member to the second cross member, wherein the second cross member extends further outward from a central vertical axis of the motor cover than the first cross member, wherein the first side member extends further outward from the central longitudinal axis than the second side member, and wherein the first cross member and the second cross member slope downward at an oblique angle $\theta_s$ relative to a horizontal plane oriented perpendicular to the central vertical axis of the motor cover.

2. The motor cover of claim 1, wherein the second cross member includes an overlapping segment that vertically overlaps the first cross member, and a non-overlapping segment that extends beyond the first cross member.

3. The motor cover of claim 2, wherein each of the overlapping segment and the non-overlapping segment has a respective length, and wherein a ratio of the length of the overlapping segment to the length of the non-overlapping segment is at least 2:1.

4. The motor cover of claim 1, wherein the lattice structure is oriented at an oblique angle $\theta_4$ relative to the central vertical axis of the motor cover such that a top of the lattice structure is located closer to the central vertical axis than a bottom of the lattice structure.

5. The motor cover of claim 1, wherein the lattice structure is oriented at an oblique angle $\theta_6$ relative to the central longitudinal axis of the motor cover such that a back of the lattice structure is located closer to the central longitudinal axis than a front of the lattice structure.

6. The motor cover of claim 1, wherein the plurality of vent openings is arranged in a plurality of columns, each column including at least two of the plurality of vent openings, wherein each column is oriented at an oblique angle $\theta_4$ relative to the central vertical axis of the motor cover such that vent openings located at a bottom of each column are positioned further outward from the central vertical axis than vent openings located at a top of each column.

7. The motor cover of claim 1, wherein the lattice structure is a first lattice structure defining a first plurality of vent openings on a first side of the motor cover, wherein the motor cover includes a second lattice structure defining a second plurality of vent openings located on a second side of the motor cover opposite the first side.

8. The motor cover of claim 1, wherein the lattice structure is a hexagonal lattice structure such that each vent opening is shaped hexagonally.

9. The motor cover of claim 1, wherein each of the first and second side members is one of V-shaped, U-shaped, and L-shaped.

10. A vacuum cleaner comprising:
    a canister defining a debris chamber;
    a lid mounted to a top of the canister and enclosing the debris chamber;
    a motor cover connected to the lid and defining a motor cavity;
    a motor connectable to a power source and enclosed within the motor cavity; and
    an impeller connected to the motor and operable to generate air flow through the debris chamber upon operation of the motor;
    wherein the motor cover includes a lattice structure defining a plurality of vent openings that provide ventilation of the motor cover, wherein each vent opening of the plurality of vent openings is defined by a first cross member, a second cross member, a first side member, and a second side member of the lattice structure, wherein the second cross member is spaced vertically below the first cross member and the first side member is spaced horizontally forward from the second side member, each of the first and second side members extending from the first cross member to the second cross member, wherein the second cross member extends further outward from a central vertical axis of the motor cover than the first cross member, wherein the first side member extends further outward from the central longitudinal axis than the second side member, and wherein the first cross member and the second cross member slope downward at an oblique angle $\theta_s$ relative to a horizontal plane oriented perpendicular to the central vertical axis of the motor cover.

11. The vacuum cleaner of claim 10, wherein the motor cover includes an exhaust located at a rear of the motor cover, the motor cover defining a front located opposite from the rear, the motor cover further defining a central longitudinal axis extending from the front of the motor cover to the rear of the motor cover, wherein the first side member of each vent opening is spaced horizontally forward from the second side member and extends further outward from the central longitudinal axis of the motor cover than the second side member.

12. The vacuum cleaner of claim 10, wherein the second cross member includes an overlapping segment that vertically overlaps the first cross member, and a non-overlapping segment that extends beyond the first cross member.

13. The vacuum cleaner of claim 12, wherein each of the overlapping segment and the non-overlapping segment has a respective length, and wherein a ratio of the length of the overlapping segment to the length of the non-overlapping segment is at least 2:1.

14. The vacuum cleaner of claim 10, wherein the lattice structure is oriented at an oblique angle $\theta_4$ relative to the central vertical axis of the motor cover such that a top of the lattice structure is located closer to the central vertical axis than a bottom of the lattice structure.

15. The vacuum cleaner of claim 10, wherein the motor cover includes an exhaust located at a rear of the motor cover, the motor cover defining a front located opposite from the rear, the motor cover further defining the central longitudinal axis extending from the front of the motor cover to the rear of the motor cover, wherein the lattice structure is oriented at an oblique angle $\theta_6$ relative to the central longitudinal axis of the motor cover such that a back of the lattice structure is located closer to the central longitudinal axis than a front of the lattice structure.

16. The vacuum cleaner of claim 10, wherein the plurality of vent openings is arranged in a plurality of columns, each column including at least two of the plurality of vent openings, wherein each column is oriented at an oblique angle $\theta_4$ relative to the central vertical axis of the motor cover such that vent openings located at a bottom of each column are positioned further outward from the central vertical axis than vent openings located at a top of each column.

17. The vacuum cleaner of claim 10, wherein the lattice structure is a first lattice structure defining a first plurality of vent openings on a first side of the motor cover, wherein the motor cover includes a second lattice structure defining a second plurality of vent openings located on a second side of the motor cover opposite the first side.

18. The motor cover of claim 10, wherein the lattice structure is a hexagonal lattice structure such that each vent opening is shaped hexagonally.

19. The motor cover of claim 10, wherein each of the first and second side members is one of V-shaped, U-shaped, and L-shaped.

20. A power head for a vacuum cleaner, the power head comprising:
a motor cover defining a motor cavity;
a motor connectable to a power source and enclosed within the motor cavity; and
an impeller connected to the motor and operable to generate air flow upon operation of the motor;
wherein the motor cover includes a lattice structure defining a plurality of vent openings that provide ventilation of the motor cover, wherein each vent opening of the plurality of vent openings is defined by a first cross member, a second cross member, a first side member, and a second side member of the lattice structure, wherein the second cross member is spaced vertically below the first cross member and the first side member is spaced horizontally forward from the second side member, each of the first and second side members extending from the first cross member to the second cross member, wherein the second cross member extends further outward from a central vertical axis of the motor cover than the first cross member, wherein the first side member extends further outward from the central longitudinal axis than the second side member, and wherein the first cross member and the second cross member slope downward at an oblique angle $\theta_s$ relative to a horizontal plane oriented perpendicular to the central vertical axis of the motor cover.

* * * * *